(12) United States Patent
Bitar et al.

(10) Patent No.: US 8,108,635 B2
(45) Date of Patent: Jan. 31, 2012

(54) SYSTEM, METHOD AND COMPUTER PROGRAM PRODUCT FOR COPYING DATA

(75) Inventors: Akram Bitar, Kfar Peqiin (IL); Shachar Fienblit, Ein Ayala (IL)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 12/163,661

(22) Filed: Jun. 27, 2008

(65) Prior Publication Data

US 2009/0327627 A1 Dec. 31, 2009

(51) Int. Cl.
*G06F 12/16* (2006.01)
(52) U.S. Cl. .......................................... 711/162; 711/170
(58) Field of Classification Search .................. None
See application file for complete search history.

(56) References Cited

U.S. PATENT DOCUMENTS

| | | | |
|---|---|---|---|
| 6,557,089 B1 * | 4/2003 | Reed et al. ................. | 711/162 |
| 7,120,769 B2 | 10/2006 | Yagawa et al. | |
| 7,130,974 B2 | 10/2006 | Iwamura et al. | |
| 7,149,769 B2 | 12/2006 | Lubbers et al. | |
| 7,549,029 B2 * | 6/2009 | Zohar et al. ................. | 711/162 |
| 7,890,714 B1 * | 2/2011 | Tsaur et al. ................. | 711/162 |
| 2003/0065901 A1 * | 4/2003 | Krishnamurthy ............ | 711/170 |
| 2005/0182910 A1 * | 8/2005 | Stager et al. ................. | 711/162 |
| 2005/0251633 A1 * | 11/2005 | Micka et al. ................. | 711/162 |
| 2007/0073986 A1 | 3/2007 | Ninose et al. | |
| 2007/0168500 A1 | 7/2007 | DSouza et al. | |
| 2008/0005146 A1 * | 1/2008 | Kubo et al. ................. | 707/102 |

OTHER PUBLICATIONS

Alison Pate, et al "RAMAC Virtual Array: Implementing Peer to Peer Remote Copy", International Technical Support Organization, Redbooks, Dec. 1998. Source: http://www.redbooks.ibm.com/redbooks/pdfs/sg245338.pdf.

* cited by examiner

*Primary Examiner* — Kaushikkumar Patel
(74) *Attorney, Agent, or Firm* — Zilka-Kotab, PC

(57) ABSTRACT

A storage system and a method for copying data is provided. The method includes storing data at a first storage unit of a primary site, transferring the data from the first storage unit to a second storage unit of a remote site and updating shadow storage unit metadata to reflect the storing of the data at the first storage unit, and copying, in response to the updating of the shadow storage unit metadata, the data from an entity that differs from the shadow storage unit to a third storage unit.

18 Claims, 5 Drawing Sheets

SYSTEM, METHOD AND COMPUTER PROGRAM PRODUCT FOR COPYING DATA

FIELD OF THE INVENTION

The present invention relates to methods, systems, and computer program products for copying data.

BACKGROUND OF THE INVENTION

The importance of data has increased during the last decade while the cost of data storage medium has decreased, thus motivating data storage vendors to provide data protection schemes that are based upon duplication of data.

One of these protection schemes is known as mirroring. Mirroring involves repetitively generating one or more duplicates of data. A peer-to-peer remote copy (PPRC) relationship can be established with one or multiple targets. The latter relationship is more robust but is much more complex. A PPRC relationship is established between a primary site and one or more secondary sites (also referred to as targets).

A single target PPRC relationship involves using a single relationship copy function. A controller can execute a single relationship copy function in order to copy the data to a single target storage unit.

A primary site that was used to establish a single target PPRC relationship can be required to apply a multiple target PPRC relationship.

The conversion (between single target PPRC relationship and multiple target PPRC relationship) can be very complex and problematic. The complexity results from the vast amount of limitations and/or conditions that define the mapping between a primary site and a secondary site.

There is a need to provide efficient methods, systems and computer program products for copying data.

SUMMARY OF THE PRESENT INVENTION

A storage system and a method for copying data, the method includes: storing data at a first storage unit of a primary site; transferring the data from the first storage unit to a second storage unit of a remote site and updating shadow storage unit metadata to reflect the storing of the data at the first storage unit; and copying, in response to the updating of the shadow storage unit metadata, the data from an entity that differs from the shadow storage unit to a third storage unit.

The method includes establishing a peer to peer remote copy relationship between the first storage unit and the second storage unit; and establishing a peer to peer remote re-direct copy relationship between the shadow storage unit and the third storage unit.

The method includes copying the data from a cache of a controller of the first storage unit to the third storage unit.

The method includes updating metadata of at least one additional shadow storage unit to reflect the storing of the data at the first storage unit; and copying, in response to the updating of the at least one additional shadow storage unit metadata, the data from at least one entity that differs from the shadow storage unit, to at least one additional storage unit.

The method includes preventing access to the shadow storage unit when an access to the first storage unit is prevented.

The method includes initiating the transferring by a first single relationship copy function and initiating the copying by a second single relationship copy function; wherein the first and second single relationship copy functions are executed by a controller of both the first storage unit and the shadow storage unit.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Methods, Systems and Computer Program Products for Copying Data are Provided

In this specification the term 'copy' and 'transfer' are equivalent to each other.

The term 'peer to peer copy relationship' is a relationship that facilitates mirroring a content of a primary memory area of a certain storage unit to a secondary memory area of another storage unit. The certain storage unit and the other storage unit are spaced apart from each other. The mirroring involves copying data from the certain storage unit to the other storage unit.

The term 'remote peer to peer re-direct copy relationship' is a relationship that facilitates mirroring of a content of a primary memory area by using a shadow storage unit. The shadow storage unit does not include the primary memory area and does not store the content of the primary memory area but it stores shadow storage unit metadata indicative of the writing of data to the primary memory area. The 'remote peer to peer re-direct copy relationship' is established between the shadow storage unit and another storage unit. The other storage unit is not aware that it does not receive the content from the shadow storage unit but rather from another entity.

It is noted that disaster recovery solutions that are applied to multi-target PPRC systems can be applied to multiple shadow storage unit systems.

Figure 1:
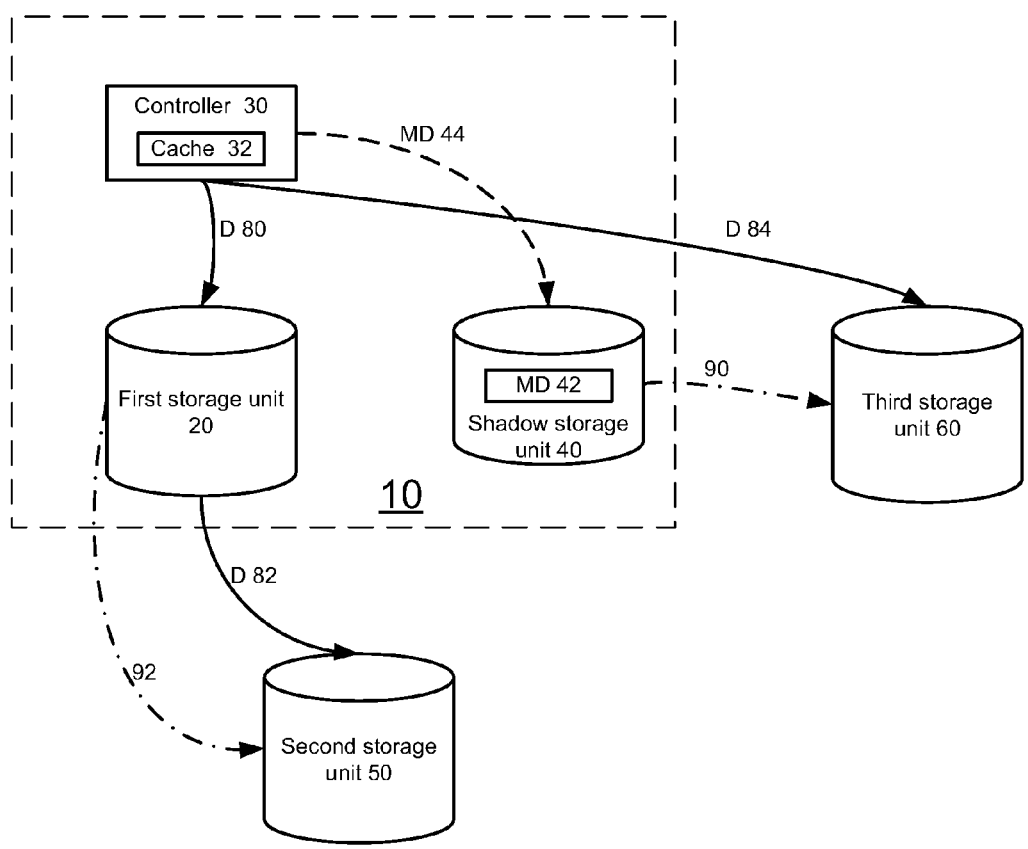
FIG. 1 illustrates a storage system, according to an embodiment of the invention.

FIG. 1 illustrates storage system 10 according to an embodiment of the invention. Storage system 10 includes first storage unit 20, controller 30, and shadow storage unit 40. Controller 30 is connected to first storage unit 20 and to shadow storage unit 40. Storage system 10 can also be referred to as primary site.

First storage unit 10 is connected to second storage unit 50. Second storage unit 50 can belong to a remote site. Third storage unit 60 is connected to shadow storage unit 40.

Data can be written to first storage unit from various sources including but not limited to cache 32 of controller 30. For convenience of explanation, the data will be denoted D while metadata will be denoted MD.

Once data is written to first storage unit 20 (as illustrated by arrow D 80) storage system 10 copies this data to second storage unit 50 (as illustrated by arrow D 82) and updates shadow storage unit metadata (as illustrated by dashed arrow 44) to reflect the storing of the data at first storage unit 20. Shadow storage unit 40 is illustrated as storing shadow storage unit metadata ('MD') 42.

The data itself is not copied to shadow storage unit 40. This update triggers the copying of the data (as illustrated by arrow D 84) to third storage unit 60. The data is not copied from shadow storage data unit 40 but rather from an entity that differs from shadow storage unit 40. This entity can be the first storage unit 20 or the entity (such as but not limited to a cache of controller 30) from which the data was written to first storage unit 20. For simplicity of explanation FIG. 1 illustrates data as being sent to third storage unit 60 from cache 32. It is noted that third storage unit 60 is conveniently controlled by a controller (not shown) that requests the data from shadow storage unit 40 and this request is re-directed to cache 32 or to first storage unit 60.

It is noted that the metadata can be updated after the transfer of data is initiated.

The third storage unit 60 is not aware that the data is not stored at the shadow storage unit 40. Any access to data that is directed to shadow storage unit 40 can be redirected to first storage unit 20.

Controller 30 can be adapted to: (i) control a storage of data at first storage unit 20; (ii) control a transfer the data from first storage unit 20 to second storage unit 50 of a remote site; (iii) update shadow storage unit metadata to reflect the storing of the data at first storage unit 20; and (iv) control a copying, in response to the updating of the shadow storage unit metadata, of the data from an entity that differs from shadow storage unit 40 to third storage unit 60 that can belong to another remote site.

It is noted that data from first storage unit 20 is copied to two other storage units—second storage unit 50 and third storage unit 60. By using shadow storage unit 40 controller 30 can manage the data copying without establishing a multiple remote peer-to-peer relationships. The transfer of data can be facilitated by establishing a peer-to-peer remote copy relationship between first storage unit 20 and second storage unit 50 and by establishing a peer-to-peer remote re-direct copy relationship between shadow storage unit 40 and third storage unit 60. These relationships are illustrated by dashed lines 90 and 92.

Controller 30 can execute a first single relationship copy function that initiates the transferring of data to second storage unit 50 and can execute a second single relationship copy function that initiates the copying of data to third storage unit 60.

It is noted that the copying of data to second storage unit 50 can be performed after establishing a synchronous peer to peer remote copying relationship or an asynchronous peer to peer remote copying relationship between first storage unit 20 and second storage unit 50.

It is noted that once first storage unit 20 fails second storage unit 50 can establish a peer-to-peer remote copying relationship with third storage unit 60.

According to another embodiment of the invention first storage unit 20 can be come unavailable (operate in an 'offline' mode, be prevented from being accessed). In this case controller 30 can prevent access to shadow storage unit 40 (turn it 'offline').

Figure 2:
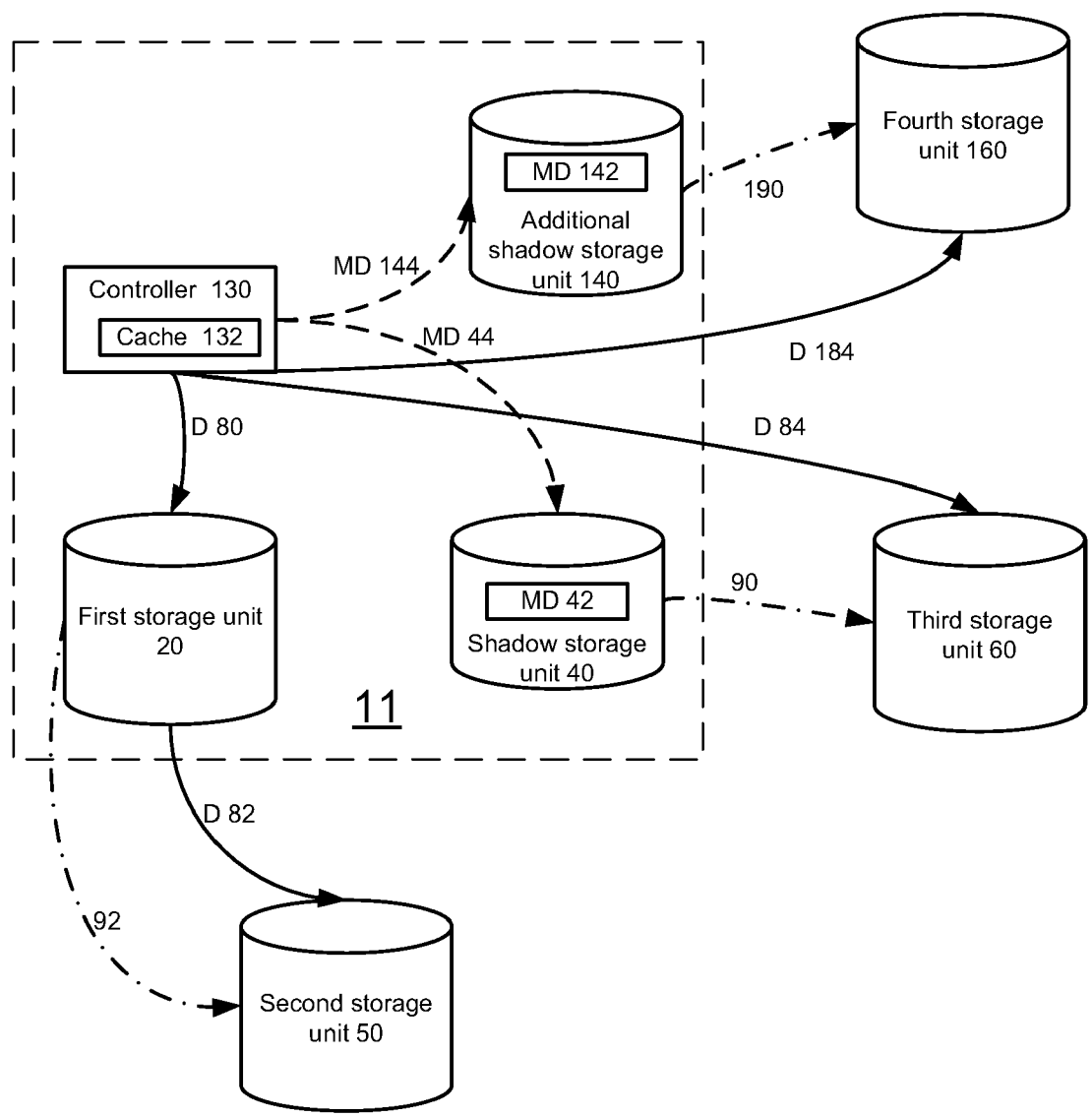
FIG. 2 illustrates a storage system, according to another embodiment of the invention.

FIG. 2 illustrates storage system 11 according to an embodiment of the invention.

Storage system 11 includes first storage unit 20, controller 130, shadow storage unit 40 and additional shadow storage unit 140. Controller 130 is connected to first storage unit 20, shadow storage unit 40 and additional storage unit 140.

Once data is written to first storage unit 20, storage system 11 copies this data to second storage unit 50 and updates shadow storage unit metadata and additional shadow storage unit metadata to reflect the storing of the data at first storage unit 20. The data itself is not copied to shadow storage unit 40 or to additional shadow storage unit 140. The update of shadow storage unit metadata triggers a copying of the data to third storage unit 60. The update of additional shadow storage unit metadata (denoted MD 142) triggers a copying of the data to fourth storage unit 160. The data is not copied from shadow storage unit 40 or from additional shadow storage unit 140 but rather from an entity that differs from shadow storage unit 40 and from an additional entity that differs from additional shadow storage unit 140. This entity can be the first storage unit 20 or the entity (such as but not limited to cache 132 of controller 130) from which the data was written to first storage unit 20.

Third storage unit 60 is not aware that the data is not stored at the shadow storage unit 40. Any access to data that is directed to shadow storage unit 40 can be redirected to first storage unit 20.

Fourth storage unit 160 is not aware that the data is not stored at the additional shadow storage unit 140. Any access to data that is directed to additional shadow storage unit 140 can be redirected to first storage unit 20.

Controller 130 can be adapted to: (i) control a storage of data at first storage unit 20; (ii) control a transfer the data from first storage unit 20 to second storage unit 50 of a remote site; (iii) update shadow storage unit metadata 42 to reflect the storing of the data at first storage unit 20; (iv) update additional shadow storage unit metadata 142 to reflect the storing of the data at first storage unit 20; (v) control a copying, in response to the updating of the shadow storage unit metadata, of the data from an entity that differs from shadow storage unit 40 to third storage unit 60 that can belong to another remote site; and (vi) control a copying, in response to the updating of the additional shadow storage unit metadata, of the data from an entity that differs from additional shadow storage unit 140 to fourth storage unit 160 that can belong to another remote site.

Fourth and third storage units 60 and 160 can be located at the same remote site or at different remote sites.

It is noted that data from first storage unit 20 is copied to three other storage units—second storage unit 50, third storage unit 60 and fourth storage unit 160. By using shadow storage unit 40 and additional shadow storage unit 140, controller 30 can manage the data copying without establishing multiple remote peer-to-peer relationships. The transfer of data can be facilitated by establishing a peer to peer remote copy relationship between first storage unit 20 and second storage unit 50, establishing a peer to peer remote re-direct copy relationship between shadow storage unit 40 and third storage unit 60 and establishing a peer to peer remote re-direct copy relationship (illustrated by dashed line 190) between additional shadow storage unit 140 and third storage unit 160.

Although FIGS. 1 and 2 illustrate one and two shadow storage units it is noted that the number of shadow storage units can exceed two.

Controller 130 can execute a first single relationship copy function that initiates the transferring of data to second storage unit 50 and can execute a second single relationship copy function that initiates the copying of data to third storage unit 60.

It is noted that the copying of data to second storage unit 50 can be performed after establishing a synchronous peer to peer remote copying relationship or an asynchronous peer to peer remote copying relationship between first storage unit 20 and second storage unit 50. It is noted that once first storage unit 20 fails second storage unit 50 can establish a peer-to-peer remote copying relationship with third storage unit 60 and/or with fourth storage unit 160.

It is further noted that although FIGS. 1 and 2 illustrate a singe controller that is connected to both first storage unit and shadow storage unit 40 that this is not necessarily so and each storage unit can have its own controller. In a multiple controller scenario it is expected that the controller will communicate with each other in order to facilitate metadata updates and copying of data.

It is noted that storage units other than first storage unit 40 can have their own shadow storage units. For example, second storage unit 50, third storage unit 60 and even fourth storage unit 160 can have their own shadow storage units.

According to another embodiment of the invention first storage unit 20 can become unavailable (operate in an 'offline' mode, be prevented from being accessed). In this case controller 30 can prevent access to shadow storage unit 40 and additionally or alternatively to additional shadow storage unit 140.

It is noted that the illustrated storage units can be connected to other storage units and establish various relationships with these other storage units, including point in time relationships.

Figure 3:
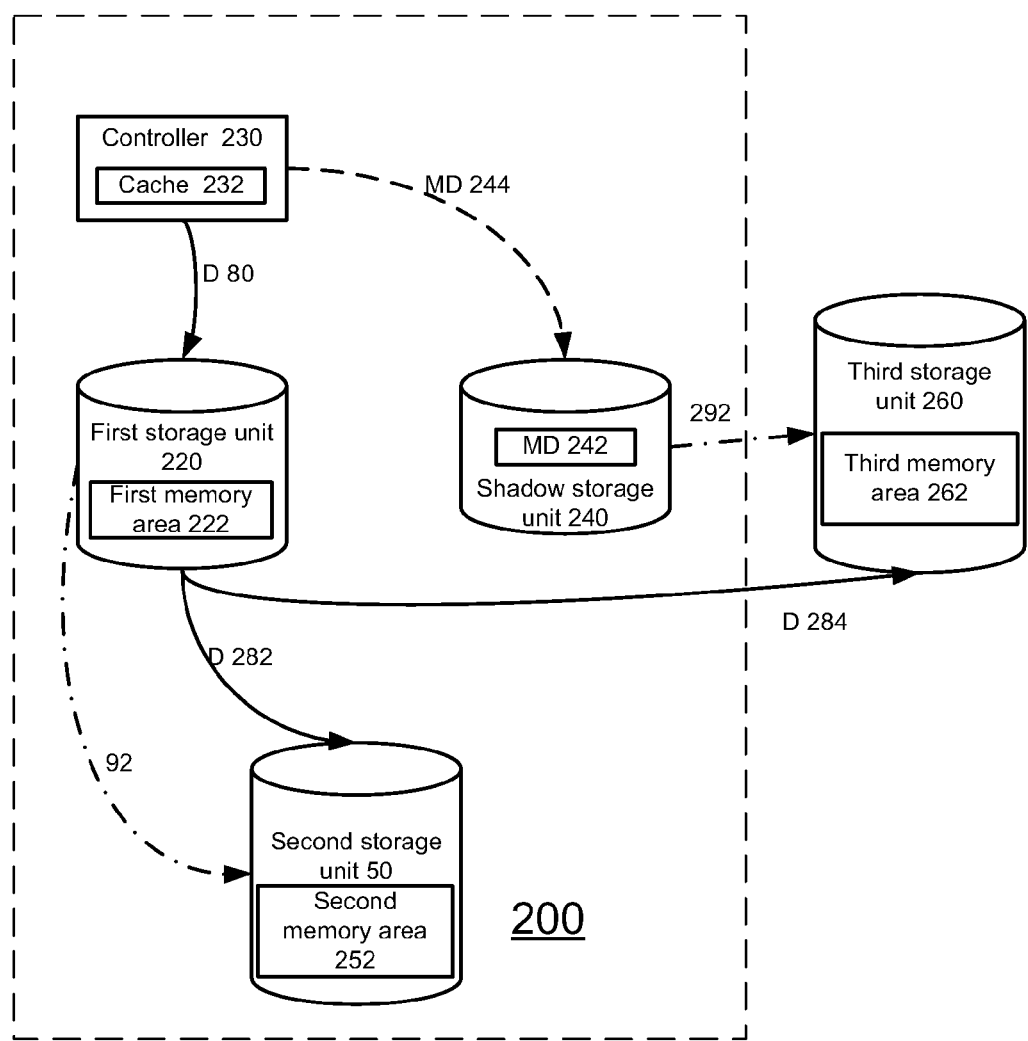
FIG. 3 illustrates a storage system, according to a further embodiment of the invention.

FIG. 3 illustrates storage system 200 according to an embodiment of the invention.

Storage unit 200 includes controller 230, first storage unit 220, second storage unit 230 and shadow storage unit 240.

Controller 230 is connected to first storage unit 220, second storage unit 220, and shadow storage unit 240.

Each storage unit may include one or more memory areas. Each memory area can include one or more memory sub areas. Conveniently a memory area is a volume and a memory sub area is a track but this is not necessarily so.

For simplicity of explanation first memory unit 220 is illustrated as including first memory area 222, second storage unit 230 is illustrated as including second memory area 232, shadow storage unit 240 is illustrated as storing shadow storage unit metadata 244 and third storage unit 260 is illustrated as including third memory area 262. It is noted that the memory area can be a volume but this is not necessarily so.

Controller 230 is adapted to: (i) control a copying of a content of first memory area 242 as it was at a certain point of time from first storage unit 220 to second memory area 232 of second storage unit 230; (ii) update shadow storage unit metadata to reflect the copying of the content to second memory area 232; (iii) and control a copying, in response to the updating of the shadow storage unit metadata, of the content of the second memory area 232 from an entity that differs from shadow storage unit 240 to third storage unit 260 and especially to third memory area 262 of third storage unit 260.

Controller 230 is adapted to establish a point in time copy relationship between first storage unit 220 and second storage unit 230 and to establish a re-direct point in time copy relationship between shadow storage unit 230 and third storage unit 240.

The copying of the content to third storage unit 250 is denoted D 284. The point in time copy relationship between first storage unit 220 and second storage unit 230 is illustrated by dashed arrow 92 and the re-direct point in time copy relationship between shadow storage unit 230 and third storage unit 240 is illustrated by dashed arrow 292.

Figure 4:
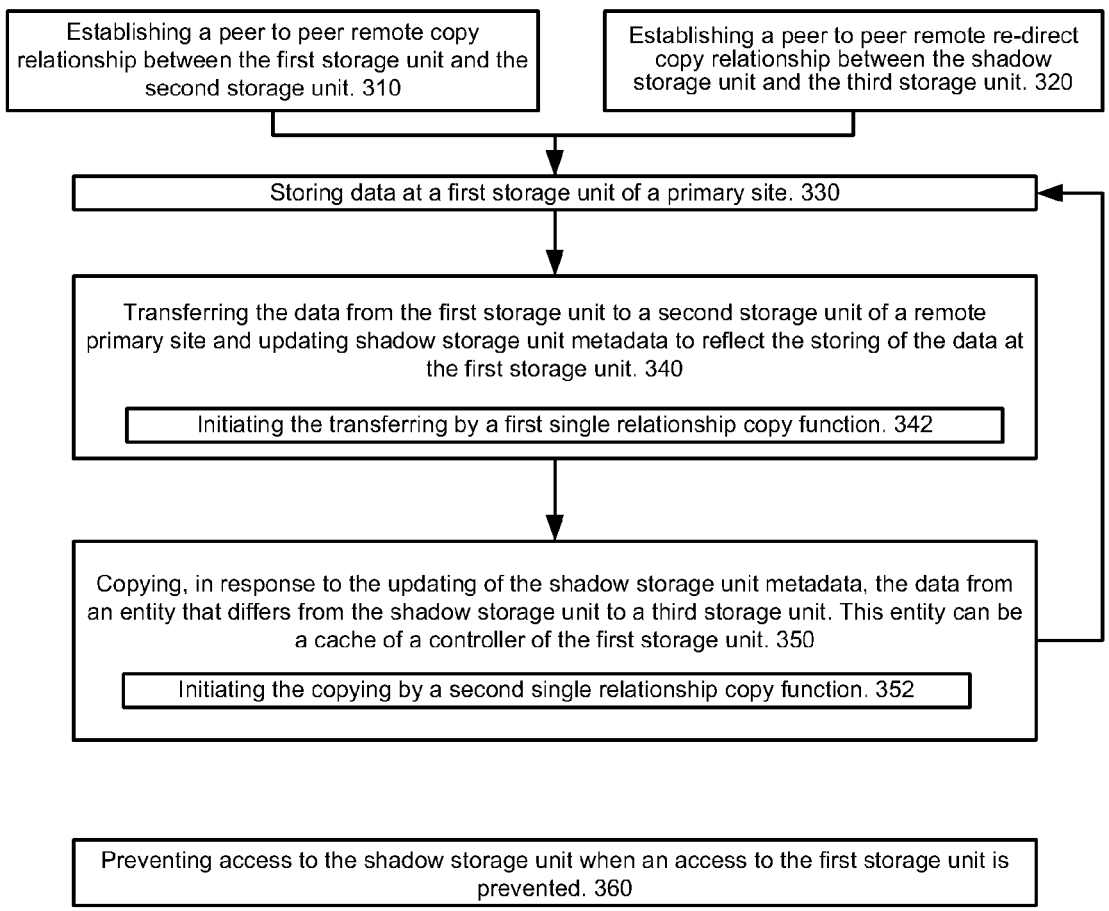
FIG. 4 illustrates a method for copying data according to an embodiment of the invention.

FIG. 4 illustrates method 300 for copying data, according to an embodiment of the invention.

Method 300 starts by stages 310 and 320.

Stage 310 includes establishing a peer-to-peer remote copy relationship between the first storage unit and the second storage unit.

Stage 320 includes establishing a peer-to-peer remote re-direct copy relationship between the shadow storage unit and the third storage unit.

Stages 310 and 330 are followed by stage 330 of storing data at a first storage unit of a primary site.

Stage 330 is followed by stage 340 of transferring the data from the first storage unit to a second storage unit of a remote site and updating shadow storage unit metadata to reflect the storing of the data at the first storage unit. Stage 340 can include stage 342 of initiating the transferring by a first single relationship copy function.

Stage 340 is followed by stage 350 of copying, in response to the updating of the shadow storage unit metadata, the data from an entity that differs from the shadow storage unit to a third storage unit that can belong to another remote site copying the data to the shadow storage unit. This entity can be a cache of a controller of the first storage unit. Stage 350 can include stage 352 of initiating the copying by a second single relationship copy function.

Stage 350 can be followed by stage 330.

It is noted that more than a single shadow storage unit can exists. In this case stage 340 also includes updating metadata of at least one additional shadow storage unit to reflect the storing of the data at the first storage unit and stage 350 also includes copying, in response to the updating of the at least one additional shadow storage unit metadata, the data from at least one entity that differs from the shadow storage unit, to at least one additional storage unit.

Method 300 includes stage 360 of preventing access to the shadow storage unit when an access to the first storage unit is prevented. It is noted that writing data to the shadow storage unit can be always prevented.

It is noted that at least some stages of method 300 can be controller by one or more controllers. For example, a single controller can be allocated to the first storage unit and to the shadow storage unit. This controller can execute the first and second single relationship copy function.

Figure 5:
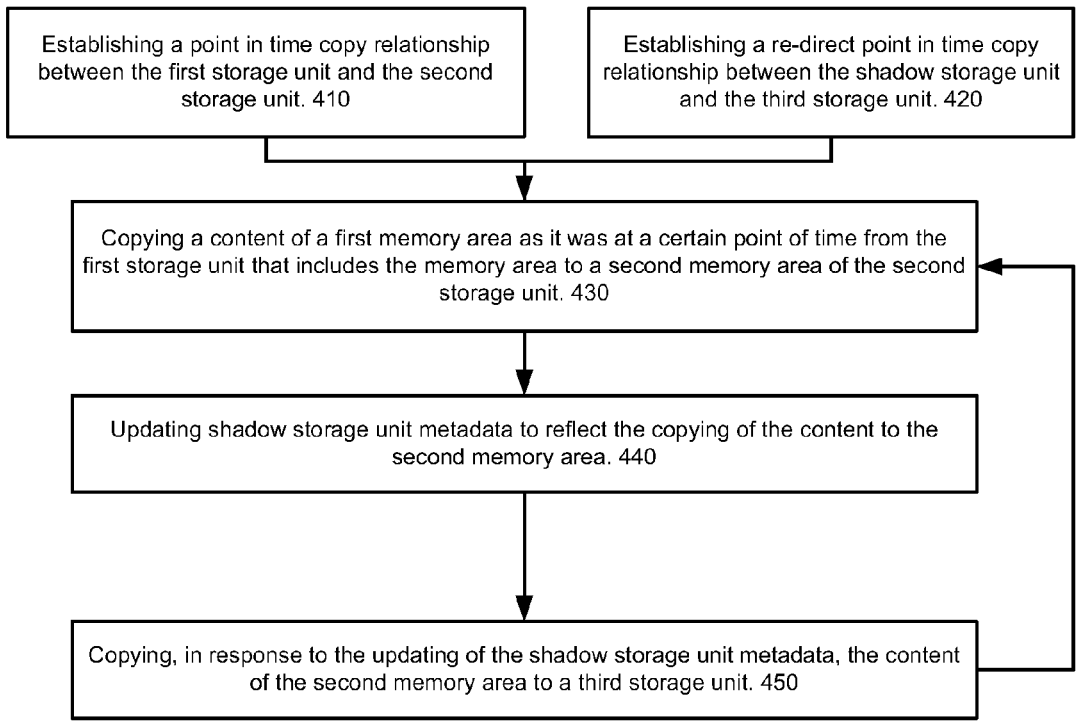
FIG. 5 illustrates a method for copying data according to another embodiment of the invention.

FIG. 5 illustrates method 400 for copying data, according to an embodiment of the invention.

Method 400 starts by stages 410 and 420. Stage 410 includes establishing a point in time copy relationship between the first storage unit and the second storage unit.

Stage 420 includes establishing a re-direct point in time copy relationship between the shadow storage unit and the third storage unit.

Stage 410 and 420 are followed by stage 430 of copying a content of a first memory area as it was at a certain point of time from the first storage unit that includes the memory area to a second memory area of the second storage unit.

Stage 430 is followed by stage 440 of updating shadow storage unit metadata to reflect the copying of the content to the second memory area.

Stage 440 is followed by stage 450 of copying, in response to the updating of the shadow storage unit metadata, the content of the second memory area to a third storage unit. It is noted that the copying is performed according to the point in time that can be maintained by the shadow storage unit.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer can be a controller (such as controllers 30, 230 and 330) or included within such a controller.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for copying data comprising:
storing data at a first storage unit of a primary site;
transferring the data from the first storage unit to a second storage unit of a remote site and updating shadow storage unit metadata to reflect the storing of the data at the first storage unit;
copying, in response to the updating of the shadow storage unit metadata, the data from an entity that differs from a shadow storage unit to a third storage unit;
establishing a peer to peer remote copy relationship between the first storage unit and the second storage unit; and establishing a peer to peer remote re-direct copy relationship between the shadow storage unit and the third storage unit.

2. The method according to claim 1 comprising copying the data from a cache of a controller of the first storage unit to the third storage unit.

3. The method according to claim 1 comprising updating metadata of at least one additional shadow storage unit to reflect the storing of the data at the first storage unit; and copying, in response to the updating of the at least one additional shadow storage unit metadata, the data from at least one entity that differs from the shadow storage unit, to at least one additional storage unit.

4. The method according to claim 1 comprising preventing access to the shadow storage unit when an access to the first storage unit is prevented.

5. The method according to claim 1 comprising initiating the transferring by a first single relationship copy function and initiating the copying by a second single relationship copy function; wherein the first and second single relationship copy functions are executed by a controller of both the first storage unit and the shadow storage unit.

6. A method for copying data, the method comprises:
copying a content of a first memory area as it was at a certain point of time from a first storage unit that comprises the memory area to a second memory area of a second storage unit;
updating shadow storage unit metadata to reflect the copying of the content to the second memory area;
copying, in response to the updating of the shadow storage unit metadata, the content of the second memory area to a third storage unit;
establishing a point in time copy relationship between the first storage unit and the second storage unit and establishing a re-direct point in time copy relationship between a shadow storage unit and the third storage unit.

7. A computer program product comprising a non-transitory computer usable medium comprises a computer readable program, wherein the computer readable program when executed on a computer causes the computer to:
store data at a first storage unit of a primary site;
transfer the data from the first storage unit to a second storage unit of a remote site and update shadow storage unit metadata to reflect the storing of the data at the first storage unit;
copy, in response to the updating of the shadow storage unit metadata, the data from an entity that differs from a shadow storage unit to a third storage unit;
establish a peer to peer remote copy relationship between the first storage unit and the second storage unit; and
establish a peer to peer remote re-direct copy relationship between the shadow storage unit and the third storage unit.

8. The computer program product according to claim 7, wherein the computer readable program when executed on a computer causes the computer to copy the data from a cache of a controller of the first storage unit to the third storage unit.

9. The computer program product according to claim 7, wherein the computer readable program when executed on a computer causes the computer to update metadata of at least one additional shadow storage unit to reflect the storing of the data at the first storage unit; and copy, in response to the updating of the at least one additional shadow storage unit metadata, the data from an entity that differs from an additional shadow storage unit to at least one additional storage unit.

10. The computer program product according to claim 7, wherein the computer readable program when executed on a computer causes the computer to prevent access to the shadow storage unit when an access to the first storage unit is prevented.

11. The computer program product according to claim 7, wherein the computer readable program when executed on a computer causes the computer to initiate the transferring by a first single relationship copy function and initiate the copying by a second single relationship copy function.

12. The computer program product according to claim 7, wherein the computer readable program when executed on a computer causes the computer to prevent access to the shadow storage unit when an access to the first storage unit is prevented.

13. A computer program product comprising a non-transitory computer usable medium including a computer readable program, wherein the computer readable program when executed on a computer causes the computer to:
copy a content of a first memory area as it was at a certain point of time from a first storage unit that comprises the memory area to a second memory area of a second storage unit;

update shadow storage unit metadata to reflect the copying of the content to the second memory area;
copy, in response to the updating of the shadow storage unit metadata, the content of the second memory area from an entity that differs from a shadow storage unit to a third storage unit;
establish a point in time copy relationship between the first storage unit and the second storage unit and establish a re-direct point in time copy relationship between the shadow storage unit and the third storage unit.

14. A storage system comprising:
a first storage unit,
a controller; and
a shadow storage unit;
wherein the controller is coupled to the first storage unit and to the shadow storage unit;
wherein the controller is configured to:
control storage of data at the first storage unit;
control transfer of the data from the first storage unit to a second storage unit of a remote site;
update shadow storage unit metadata to reflect the storing of the data at the first storage unit;
control copying, in response to the updating of the shadow storage unit metadata, the data from an entity that differs from the shadow storage unit to a third storage unit;
establish a peer to peer remote copy relationship between the first storage unit and the second storage unit; and establish a peer to peer remote re-direct copy relationship between the shadow storage unit and the third storage unit.

15. The system according to claim 14 wherein the controller is adapted to copy the data from a cache of the controller to the third storage unit.

16. The system according to claim 14 wherein the controller is configured to update metadata of at least one additional shadow storage unit to reflect the storing of the data at the first storage unit; and to control a copying, in response to the update of the at least one additional shadow storage unit metadata, the data from at least one entity that differs from a shadow storage unit to at least one additional storage unit.

17. The system according to claim 14 wherein the controller is configured to execute a first single relationship copy function that initiates the transferring and execute a first single relationship copy function that initiates the copying.

18. A storage system comprising:
a controller that is coupled to a first storage unit, a second storage unit, and a shadow storage unit;
wherein the controller is configured to:
control copying of a content of a first memory area as it was at a certain point of time from a first storage unit that comprises the memory area to a second memory area of the second storage unit;
update shadow storage unit metadata to reflect the copying of the content to the second memory area;
control copying, in response to the updating of the shadow storage unit metadata, of the content of the second memory area from an entity that differs from the shadow storage unit to a third storage unit;
establish a point in time copy relationship between the first storage unit and the second storage unit and establish a re-direct point in time copy relationship between the shadow storage unit and the third storage unit.

* * * * *